US009965882B2

(12) United States Patent
Murphy-Chutorian et al.

(10) Patent No.: US 9,965,882 B2
(45) Date of Patent: *May 8, 2018

(54) GENERATING IMAGE COMPOSITIONS

(71) Applicant: Google Inc., Mountain View, CA (US)

(72) Inventors: Erik Murphy-Chutorian, Palo Alto, CA (US); Matthew Steiner, Los Altos, CA (US); Vahid Kazemi, Mountain View, CA (US); Shengyang Dai, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/283,511

(22) Filed: Oct. 3, 2016

(65) Prior Publication Data

US 2017/0024919 A1    Jan. 26, 2017

Related U.S. Application Data

(63) Continuation of application No. 14/064,164, filed on Oct. 27, 2013, now Pat. No. 9,460,533.

(51) Int. Cl.
*G06K 9/00* (2006.01)
*G06T 11/60* (2006.01)
*G06T 7/73* (2017.01)

(52) U.S. Cl.
CPC ............... *G06T 11/60* (2013.01); *G06T 7/73* (2017.01); *G06T 2207/10004* (2013.01); *G06T 2207/20221* (2013.01)

(58) Field of Classification Search
CPC . G06T 11/60; G06T 7/73; G06T 2207/10004; G06T 2207/20221–2207/20224
See application file for complete search history.

(56) References Cited

U.S. PATENT DOCUMENTS

| 8,488,899 | B2 | 7/2013 | Hamada |
| 9,076,270 | B2* | 7/2015 | Murphy-Chutorian .......... G06K 9/00677 |
| 9,460,533 | B2* | 10/2016 | Murphy-Chutorian . G06T 11/60 |
| 9,619,732 | B2* | 4/2017 | Murphy-Chutorian ............ G06K 9/6218 |
| 2009/0096808 | A1 | 4/2009 | Winn et al. |
| 2009/0263038 | A1 | 10/2009 | Luo et al. |

(Continued)

FOREIGN PATENT DOCUMENTS

| JP | 4341662 | 10/2009 |
| WO | 2012/166305 | 12/2012 |

OTHER PUBLICATIONS

KIPO, Notice of Allowance for Korean Patent Application No. 10-2016-7010720, dated Sep. 19, 2017, 2 pages.
International Bureau of WIPO, International Preliminary Report on Patentability for International Patent Application No. PCT/US2014/062296, dated May 12, 2016, 5 pages.
European Patent Office, International Search Report and Written Opinion for International Patent Application No. PCT/US2014/062296, dated Apr. 10, 2015, 8 pages.

(Continued)

*Primary Examiner* — Aaron W Carter
(74) *Attorney, Agent, or Firm* — IP Spring

(57) ABSTRACT

Implementations generally relate to generating image compositions. In some implementations, a method includes receiving a plurality of photos from a user and determining one or more composition types from the photos. The method further includes generating one or more compositions from the received photos based on the one or more determined composition types, where each composition is based on modified foregrounds of the photos. The method further includes providing the one or more generated compositions to the user.

20 Claims, 12 Drawing Sheets

(56) References Cited

U.S. PATENT DOCUMENTS

| | | |
|---|---|---|
| 2010/0322521 A1 | 12/2010 | Tal et al. |
| 2012/0027294 A1 | 2/2012 | Krolczyk et al. |
| 2013/0121618 A1* | 5/2013 | Yadav ............... G06T 5/008 382/294 |
| 2013/0223758 A1 | 8/2013 | Hou et al. |
| 2014/0176744 A1* | 6/2014 | Horowitz ............ G06F 3/013 348/211.99 |
| 2014/0341482 A1* | 11/2014 | Murphy-Chutorian ....... G06K 9/00677 382/284 |
| 2015/0116350 A1* | 4/2015 | Lin ................. G06T 3/0012 345/620 |
| 2015/0117784 A1* | 4/2015 | Lin ................. G06K 9/4671 382/195 |
| 2015/0117794 A1* | 4/2015 | Murphy-Chutorian . G06T 11/60 382/284 |
| 2016/0034785 A1* | 2/2016 | Murphy-Chutorian ....... G06K 9/00677 382/225 |

OTHER PUBLICATIONS

IP Australia, Patent Examination Report No. 1 for Australian Patent Application No. 2014339827, dated May 2, 2016, 3 pages.

Samsung, "AT&T Cell phones: How do I take an Eraser photo using my Samsung Galaxy S4", www.samsung.com/us/support/SupportOwnersFAQPopup.do?faq_id=FAQ00052842&fm_seq=62077#, 2013, 1 page.

Samsung, "Drama Shot", http://www.samsung.com/global/microsite/galaxys4/fun.html#page=dramashot, 2013, 1 page.

USPTO, First Action Interview Office Action for U.S. Appl. No. 14/064,164, dated Dec. 4, 2015, 10 pages.

USPTO, First Action Interview, Pre-Interview Communication for U.S. Appl. No. 14/064,164, dated Jun. 19, 2015, 3 pages.

USPTO, Notice of Allowance for U.S. Appl. No. 14/064,164, dated Jun. 13, 2016, 7 pages.

IP Australia, Notice of Acceptance for Australian Patent Application No. 2014339827, dated Feb. 1, 2017, 3 pages.

IP Australia, Patent Examination Report No. 2 for Australian Patent Application No. 2014339827, dated Sep. 29, 2016, 6 pages.

* cited by examiner

1000

1100

1200

GENERATING IMAGE COMPOSITIONS

CROSS-REFERENCE TO RELATED APPLICATIONS

This application is a continuation of U.S. patent application Ser. No. 14/064,164, filed Oct. 27, 2013 and titled GENERATING IMAGE COMPOSITION, which is hereby incorporated by reference in its entirety.

BACKGROUND

Social network systems often enable users to upload photos and to create photo albums. Social network systems also enable users to share photos with each other. For example, users can share photos with friends and family, which provides enjoyable and bonding experiences among users of social network systems. A user can create a photo album that is associated with the user's profile. As owner of the photo album, the user can then allow other users to view the photo album when visiting the photo section of the user's profile.

SUMMARY

Implementations generally relate to generating image compositions. In some implementations, a method includes receiving a plurality of photos from a user and determining one or more composition types from the photos. The method further includes generating one or more compositions from the received photos based on the one or more determined composition types, where each composition is based on modified foregrounds of the photos. The method further includes providing the one or more generated compositions to the user.

With further regard to the method, in some implementations, the determining includes determining similar content in the photos. In some implementations, the one or more composition types include one or more action compositions. In some implementations, the one or more composition types include one or more clutter-free compositions. In some implementations, the generating includes aligning photos used in each generated composition. In some implementations, the generating includes normalizing photos used in each generated composition. In some implementations, the generating includes smoothing photos used in each generated composition. In some implementations, the method further includes selecting photos from the received photos for an action composition based on predetermined action selection criteria, and generating an action composition, where the active object is shown in different positions in the action composition. In some implementations, the method further includes selecting photos from the received photos for a clutter-free composition based on predetermined clutter-free selection criteria, and generating a clutter-free composition, where one or more clutter objects are absent in the action composition.

In some implementations, a method includes receiving a plurality of photos from a user and determining one or more composition types from the photos, where the one or more composition types include one or more of action compositions and clutter-free compositions. The method further includes generating one or more compositions from the received photos based on the one or more determined composition types, where each composition is based on modified foregrounds of the photos, where the generating includes one or more of aligning, normalizing, smoothing, and blending photos used in each generated composition. The method further includes providing the one or more generated compositions to the user.

With further regard to the method, in some implementations, the one or more composition types include one or more action compositions. In some implementations, the one or more composition types include one or more clutter-free compositions. In some implementations, the determining includes determining of similar content in the photos.

In some implementations, a system includes one or more processors, and logic encoded in one or more tangible media for execution by the one or more processors. When executed, the logic is operable to perform operations including: receiving a plurality of photos from a user; determining one or more composition types from the photos; generating one or more compositions from the received photos based on the one or more determined composition types, where each composition is based on modified foregrounds of the photos; and providing the one or more generated compositions to the user.

With further regard to the system, in some implementations, to determine the one or more composition types, the logic when executed is further operable to perform operations includes determining similar content in the photos. In some implementations, the one or more composition types include one or more action compositions. In some implementations, the one or more composition types include one or more clutter-free compositions. In some implementations, to generate the one or more compositions, the logic when executed is further operable to perform operations including aligning photos used in each generated composition. In some implementations, to generate the one or more compositions, the logic when executed is further operable to perform operations including normalizing photos used in each generated composition. In some implementations, to generate the one or more compositions, the logic when executed is further operable to perform operations including smoothing photos used in each generated composition.

DETAILED DESCRIPTION

Implementations for generating compositions in a social network system are described. In various implementations, a system receives photos from a user. The system then determines one or more composition types from the photos. For example, the one or more composition types may include action compositions and clutter-free compositions. These types of compositions are described in more detail below.

The system then generates the compositions from the received photos based on the one or more determined composition types, where each composition is based on modified foregrounds of the photos, where the generating includes one or more of aligning, normalizing, smoothing, and blending photos used in each generated composition.

In some implementations, the one or more composition types include one or more action compositions. In some implementations, the generating of the one or more compositions includes: selecting photos from the received photos for an action composition based on predetermined action selection criteria; detecting an active object in each of the selected photos based on predetermined action detection criteria; and generating an action composition, where the active object is shown in different positions in the action composition.

In some implementations, the one or more composition types include one or more clutter-free compositions. In some implementations, the generating of the one or more compositions includes: selecting photos from the received photos for a clutter-free composition based on predetermined clutter-free selection criteria; detecting one or more clutter objects in each of the selected photos based on predetermined clutter detection criteria; and generating a clutter-free composition, where one or more clutter objects are absent in the action composition. The system then provides the one or more generated compositions to the user.

Figure 1:
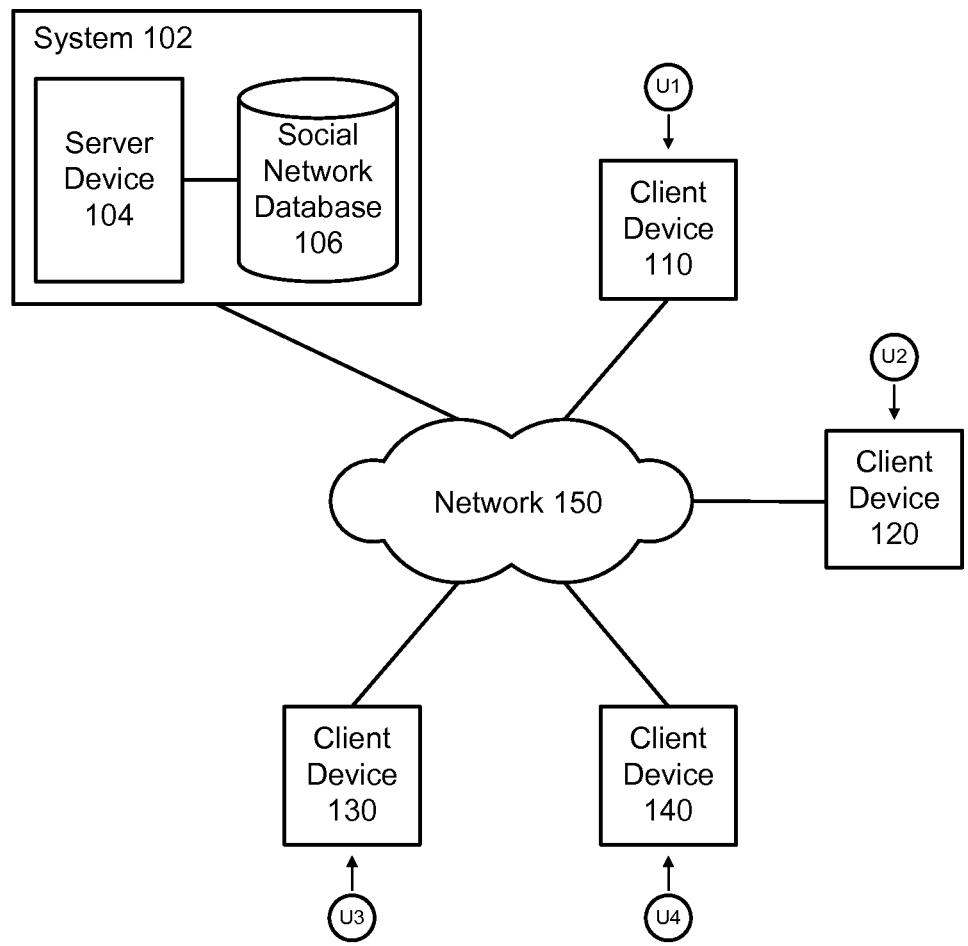
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other, where respective client devices 110, 120, 130, and 140 transmit compositional media content to each other.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
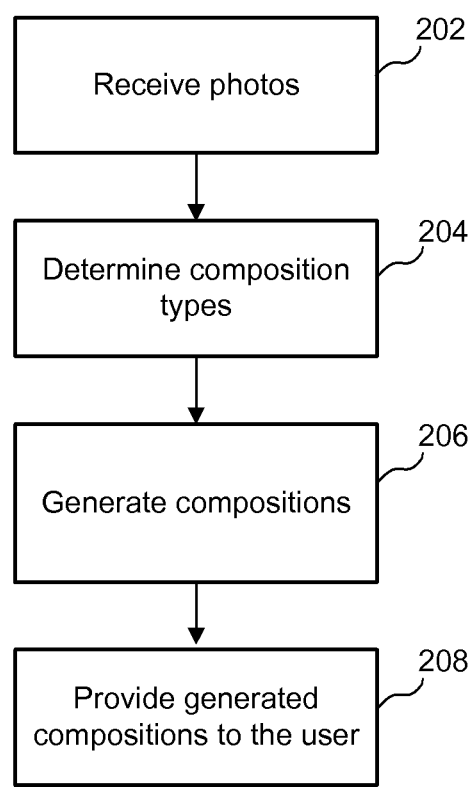
FIG. 2 illustrates an example simplified flow diagram for generating compositions, according to some implementations.

FIG. 2 illustrates an example simplified flow diagram for generating compositions, according to some implementations. In various implementations, system 102 may generate compositions in a social network system, or anywhere visual media may be used and/or viewed. Referring to both FIGS. 1 and 2, a method is initiated in block 202, where system 102 receives a set of photos from a user. In various implementations, the photos may be received when the user uploads the photos to system 102 or after the user adds the photos to one or more photo albums. In some implementations, system 102 may enable a camera device (e.g., smart phone) of the user to automatically upload photos to system 102 as the camera device captures photos.

In block 204, system 102 determines one or more composition types from the photos. The composition types may include one or more of action compositions and/or clutter-free compositions. As described in more detail below, system 102 determines which types of compositions that can be generated from the photos. To do so, in various implementations, system 102 analyzes the photos to determine which photos are appropriate for each type of composition.

In various implementations, system 102 considers photos that are taken in sequence and that are visually similar within frames of photos to be candidates for action compositions and/or for clutter-free compositions.

In various implementations, to determine the composition types that can be made from the photos, system 102 utilizes recognition algorithms to analyze photos in order to find appropriate photos for different composition types. In various implementations, system 102 analyzes a sequence of photos to detect which components are foreground and background, including which objects are in the foreground and which objects are in the background.

For example, system 102 may utilize a recognition algorithm to recognize a foreground object in a series of photos, where the foreground object is in different positions in the different photos relative to a static background. System 102 may determine that such photos are good candidates for an action composition. Example implementations of recognition algorithms are described in more detail below.

In some implementations, to determine composition types from the photos, system 102 may determine similar content in the different photos in a group of photos. For example, system 102 may recognize the same object in the center region of the group of photos. In another example, system 102 may recognize the same monument in a group of photos. In some implementations, system 102 may determine the similarity of photos based on metadata in the photos. For example, metadata such as tags, timestamps, geo-location, etc. may indicate similar photos.

In block 206, system 102 generates one or more compositions from the received photos based on the one or more determined composition types. In various implementations, to generate compositions from the photos, system 102 selects candidate photos from a set or group of photos based on the determined composition types. The selection process may occur as a part of or prior to the generation processes.

Various implementations for selecting candidate photos are described in more detail below.

In various implementations, each composition is based on modified foregrounds of the photos. For example, system 102 may generate an action composition that shows an object in the foreground moving relative to a background scene, where the object is shown in different positions relative to the background scene. Implementations directed to action compositions are described in more detail below in connection with FIGS. 3-6.

In another example implementation, system 102 may generate a clutter-free composition that shows an object such as a building, monument, landscaping, etc., that is absent of visual obstructions such as bystanders, cars, etc. To generate a clutter-free composition, system 102 removes or "erases" such visual obstructions. Implementations directed to action compositions are described in more detail below in connection with FIGS. 7-11.

As described in more detail below, when generating compositions, system 102 may perform one or more of aligning photos used in each generated composition, normalizing photos used in each generated composition, smoothing photos used in each generated composition, and blending photos used in each generated composition.

In various implementations, to ensure high-quality compositions, the predetermined selection criteria may include determinations that algorithms for one or more of aligning, normalizing, smoothing, and blending can be applied to photos used in each generated composition. Example implementations of such algorithms are described in more detail below.

In block 208, system 102 provides the one or more generated compositions to the user. For example, in some implementations, system 102 may send a message to the user indicating that system 102 has generated one or more compositions and has added the compositions to the user's upload stream or photo album. In various implementations, system 102 may generate and cause a visual badge to overlay an image associated with the composition. In various implementations, system 102 may generate and cause a second or combined visual badge to overlay the composition, where the visual badge indicates the type of composition (e.g., an action composition, a clutter-free composition, etc.).

In some implementations, system 102 may allow for some user interaction or feedback. For example, rather than automatically generating an animation, system 102 may detect photos that would make a particular composition and then prompt the user to initiate generation of the composition (e.g., with a single click or selection of a button).

Figure 3:
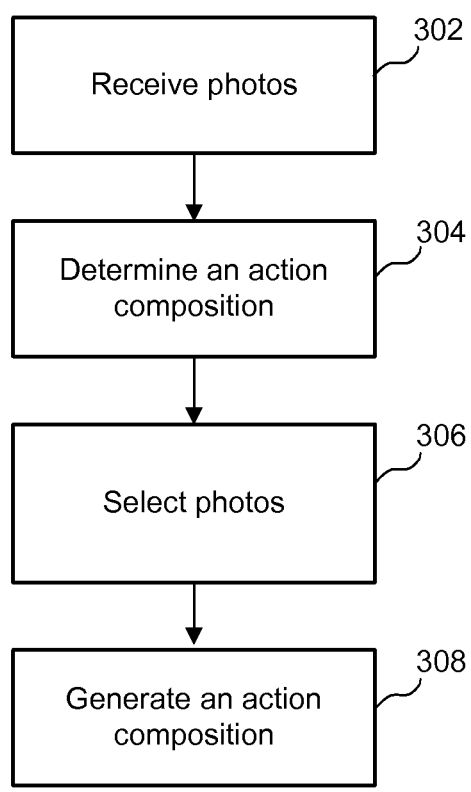
FIG. 3 illustrates an example simplified flow diagram for generating an action composition, according to some implementations.

FIG. 3 illustrates an example simplified flow diagram for generating an action composition, according to some implementations. Referring to both FIGS. 1 and 3, a method is initiated in block 302, where system 102 receives a set of photos from a user.

In block 304, system 102 determines an action composition from the photos. In other words, system 102 determines that at least some of the received photos are good candidates to construct an action composition.

As indicated above, an action composition is based on modified foregrounds of the photos. For example, system 102 may generate an action composition that shows an object in the foreground moving relative to a background scene, where the object is shown in different positions relative to the back ground scene.

In another example implementation, system 102 may generate a clutter-free composition that shows an object such as a building, monument, landscaping, etc., that is absent of visual obstructions such as bystanders, cars, etc.

In block 306, system 102 selects photos from the received photos for an action composition based on predetermined action selection criteria. For example, the predetermined selection criteria may include a determination that the photos were captured in sequence.

In various implementations, the predetermined action selection criteria may include a determination that similar content in the foreground changes position relative to the scene and/or background, from photo to photo. In some implementations, the predetermined action selection criteria may include a determination that the content changing positions is in the central portion of the photos. In some implementations, system 102 may enable the user to select which photos sequences are appropriate for an action composition.

Figure 4:
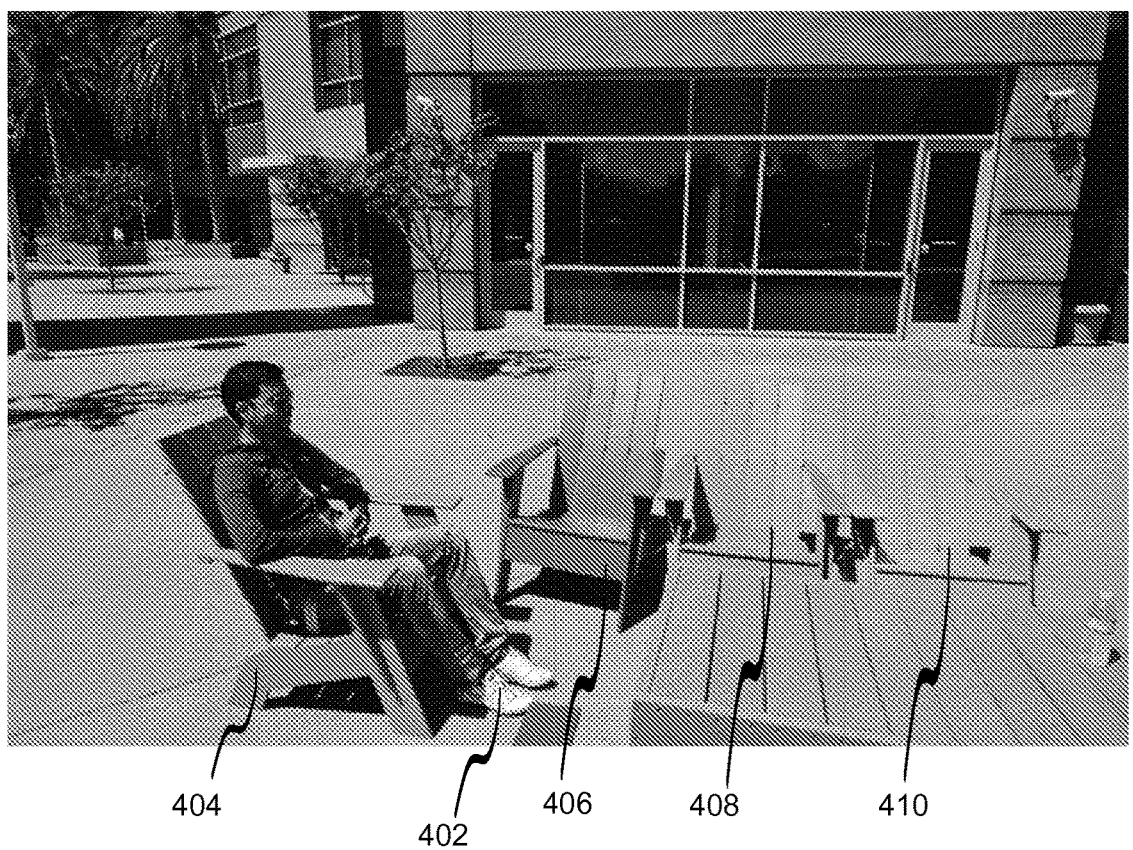
FIG. 4 illustrates an example selected photo for an action composition, according to some implementations.

FIG. 4 illustrates an example selected photo 400 for an action composition, according to some implementations. As shown, a person 402 in the foreground is sitting in a chair 404 in the scene. In subsequent photos, person 402 changes position relative to the scene (e.g., from chair 404 to chair 406, to 408, and to 410), from photo to photo, which is illustrated in FIG. 5.

In block 308, system 102 generates an action composition, where the active object is shown in different positions in the action composition.

Figure 5:
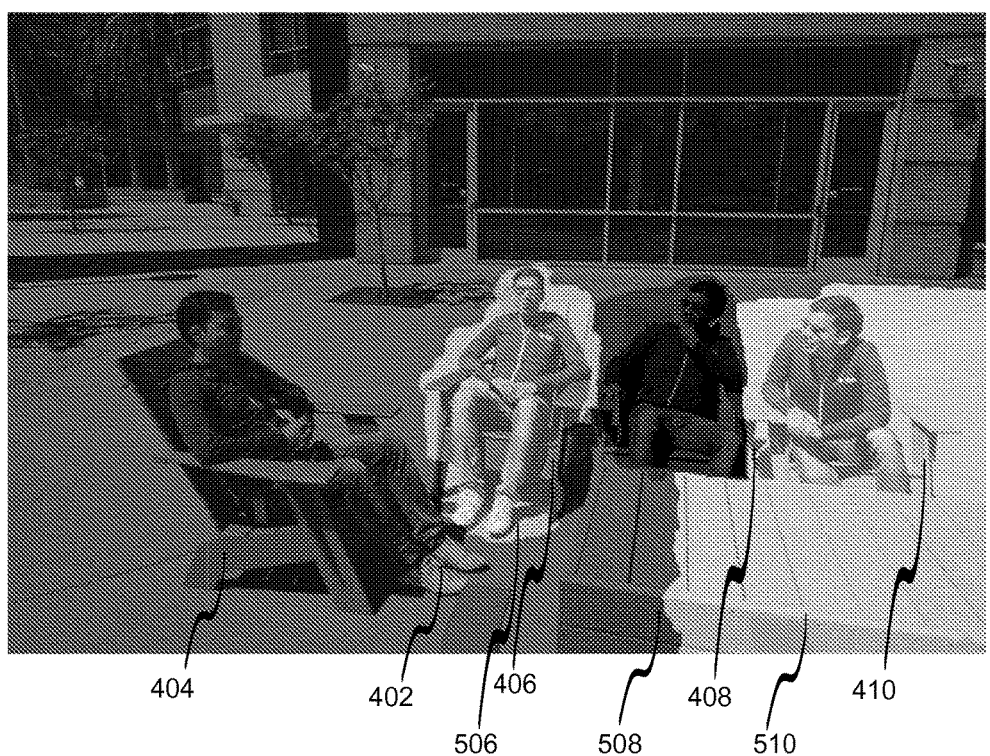
FIG. 5 illustrates an example preliminary action composition, according to some implementations.

FIG. 5 illustrates an example preliminary action composition 500, according to some implementations. In various implementations, action composition 500 includes portions of photos, where an object (e.g., person 402) changes position relative to the scene from photo to photo. For example, in the series of photos, person 402 changes positions from chair 404 to chair 406, to 408, and to 410. Action composition 500 includes portions of those photos as shown.

In various implementations, system 102 may apply a segmentation algorithm to segment photos into portions, referred to as patches. As shown, patches 506, 508, and 510 show portions where person 402 is sitting respective chairs 406, 408, and 410, where each patch is taken from a different photo.

In some implementations, patches from some photos are added to one photo, which may be referred to as a base photo. In this example implementations, the base photo is photo 400 of FIG. 4, where person 402 is sitting in chair 404. While patches 506, 508, and 510 are shown in different shades of gray, in some implementations, patches 506, 508, and 510 may have other distinguishing colors (e.g., blue, red, yellow, etc.).

In some embodiments, system 102 segments a given photo into one or more patches by comparing the photo to other photos in the sequence of photos, where system 102 determines different objects by identifying unique pixels from photo to photo. In some implementations, system 102 may prompt the user manually select regions in a photo to be removed or copied. System 102 designates one or more patches by determining boundaries around particular identified objects. As a result, system generates patches around objects that are different in a given portion of the photos. System 102 adds or stitches the patches together to construct a composition.

In some implementations, for action compositions, the confidence that a pixel is high if more pixels agree on the same value. For example, if there are 5 pixels in a given location of 5 photos, and 4 pixels have the same value but one pixel has a different value, there is high confidence that there is motion in the pixel.

In some implementations, for clutter-free compositions (described below), the confidence that a pixel is high if pixels agree on the same color. For example, if there are 5 pixels in a given location of 5 photos, there is high confidence if 4 pixels have the same color value.

In some implementations, system 102 applies a segmentation algorithm that partitions regions. The segmentation algorithm may also be referred to as a graph-cut algorithm. In some implementations, the segmentation algorithm solve the problem of partitioning graph nodes into two sets such that the sum of weights defined over the connecting edges between the sets is minimal. In some implementations, min-cut and Max-flow problems are equal and may be solved efficiently using any suitable algorithms such as shortest augmenting path or push relabel algorithms. This works with binary partitioning scenarios.

In various implementations, system 102 applies a blending algorithm to add or combine patches together. In various implementations, system 102 applies the segmentation algorithm and blending algorithm when generating action compositions and/or clutter-free compositions.

Figure 6:
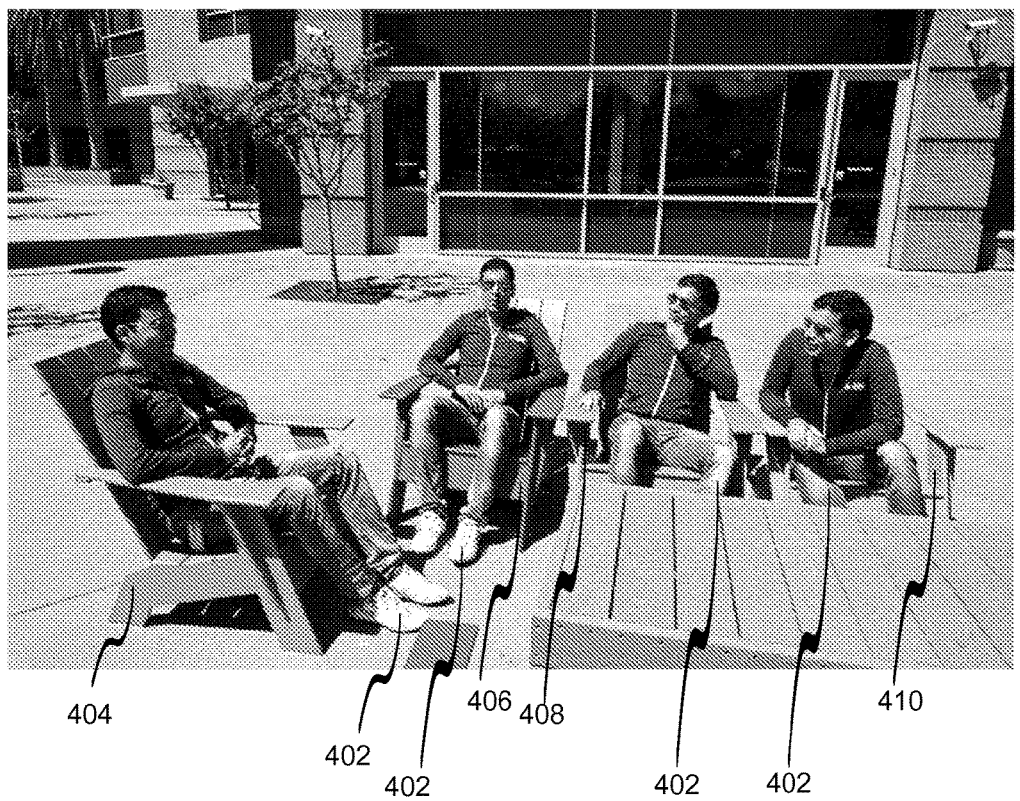
FIG. 6 illustrates an example action composition, according to some implementations.

FIG. 6 illustrates an example action composition 600, according to some implementations. As shown, person 402 is sitting chairs 404, 406, 408, and 410 in the same composition. With zero user-action or user-intent, system 102 generates a single composition or photo that blends the foreground action from multiple photos.

While some example implementations are described in the context of a person positioning himself in different seats, such implementations and others may apply to other cinematic actions (e.g., four sequential photos of a skier jumping being combined into a single photo, etc.).

In various implementations, in order to generate high-quality compositions, system 102 applies various algorithms that align, normalize, smooth, and blend photos (including patches of photos) used in each generated composition. In some implementations, system 102 might not generate a composition for a sequence of photos if the photos cannot be aligned, normalized, smoothed, and/or blended to generate a high-quality composition. This avoids compositions where an object such as a person is partially shown, or an object shows up twice in a composition. In various implementations, system 102 applies the algorithms for aligning, normalizing, smoothing, and blending photos generating action compositions and/or clutter-free compositions.

In various implementations, system 102 applies an alignment algorithm that aligns photos when generating compositions. In particular, system 102 may align the static portions of photos together. System 102 may also match feature point across pairs of photos. In some implementations, system 102 may align photos by homography (e.g., homography transformations), a technology used in video stabilization).

In various implementations, system 102 applies a normalization algorithm that performs color adjustments and color voting to the photos when generating compositions. To make color adjustments, system 102 normalizes the color of each photo to a reference. This adjusts for changes in lighting and keeps consistent color among the photos.

In some implementations, system 102 applies color voting, where each overlapping pixel for the aligned sequence votes using the pixel color. Pixels that deviate from the majority color are considered potential foreground. In some implementations, system 102 may apply the normalization algorithm to the photos in order to normalize various other image parameters (e.g., exposure, brightness, contrast, etc.) in the photos.

In some implementations, system 102 may apply a smoothing algorithm to the photos in order to smooth the pixel votes using an energy minimization algorithm. In various implementations, the energy minimization algorithm 102 prefers color consistency over boundaries. The energy minimization algorithm 102 may also apply a penalty for small regions or disjointed regions.

In some implementations, system 102 may apply a blending algorithm to perform blending on stitch boundaries in order to reduce artifacts. In some implementations, system 102 may apply an inpainting algorithm using generalized distance transforms to fill holes where no photo had suitable background examples. In some implementations, the inpainting algorithm may use a generalized distance transform to find the pixel with minimum distance to each low confidence pixel, and use this as reference. The inpainting algorithm may also find the closest label for each pixel that matches the reference.

In some implementations, system 102 may apply a modeling algorithm for color modeling with random forests. In some implementations, the modeling algorithm may use a random forest classifier to discriminate between foreground/background pixels.

In some implementations, stitching artifacts can be reduced by performing Gaussian smoothing on the edges. In some implementations, to avoid merging with foreground pixels, system 102 may skip high contrast regions. In some scenarios, the segmentation algorithm produces smooth boundaries, which may minimize the need for blending.

Figure 7:
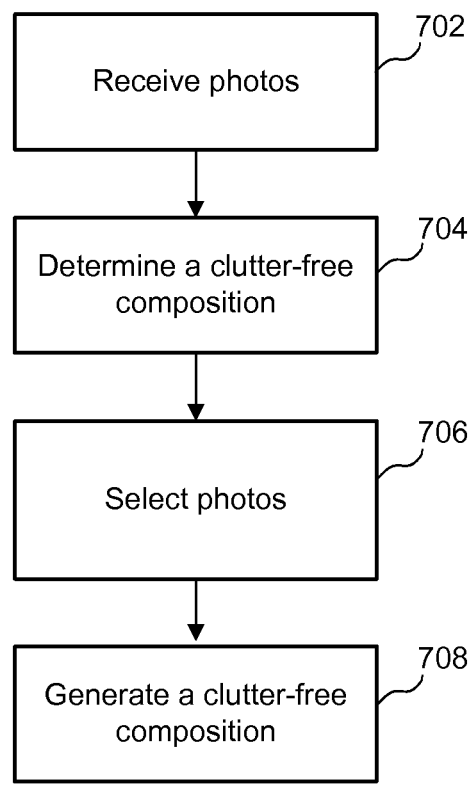
FIG. 7 illustrates an example simplified flow diagram for generating a clutter-free composition, according to some implementations.

FIG. 7 illustrates an example simplified flow diagram for generating a clutter-free composition, according to some implementations. Referring to both FIGS. 1 and 7, a method is initiated in block 702, where system 102 receives a set of photos from a user.

In block 704, system 102 determines a clutter-free composition from the photos. In other words, system 102 determines that at least some of the received photos are good candidates to construct a clutter-free composition.

As indicated above, a clutter-free composition is based on modified foregrounds of the photos. For example, system 102 may generate a clutter-free composition that shows an object such as a building, monument, landscaping, etc., that is absent of visual obstructions such as bystanders, cars, etc. System 102 may construct the clutter-free composition using multiple photos from a set photos, where each photo reveals different portions of an object (e.g., different portions of a monument).

In block 706, system 102 selects photos from the received photos for a clutter-free composition based on predetermined clutter-free selection criteria. For example, the predetermined clutter-free selection criteria may include a determination that the photos were captured in sequence. In various implementations, the predetermined action selection criteria may include a determination that similar content in the photos and that such content is often occluded by people: boardwalk, bridge, building, city, downtown, house, properties, road, skyscraper, street, structure, tower, etc., or have an object recognition match to a physical place (e.g., a landmark, etc.). System 102 may utilize any suitable algorithm to annotate photos and match landmarks. In various implementations, system 102 may utilize any suitable computer vision annotation for scenes. In some implementations, system 102 may enable the user to select which photos sequences are appropriate for a clutter-free composition.

Figure 8:
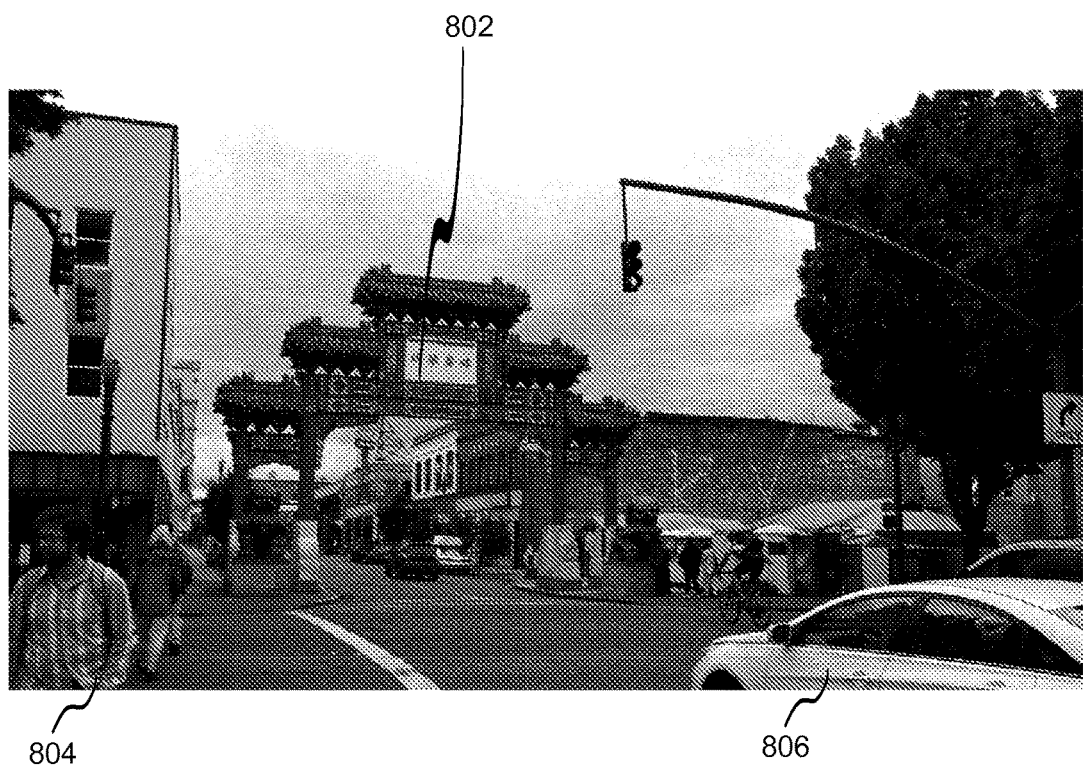
FIG. 8 illustrates an example selected photo for a clutter-free composition, according to some implementations.

FIG. 8 illustrates an example selected photo 800 for a clutter-free composition, according to some implementations. FIG. 8 shows a monument 802 with a person 804 and a car 806 in the foreground of the scene.

Figure 9:
FIG. 9 illustrates an example selected photo for the clutter-free composition, according to some implementations.

FIG. 9 illustrates an example selected photo 900 for the clutter-free composition, according to some implementations. FIG. 9 shows monument 802 with a person 908 and car 806 in the foreground of the scene.

In block 708, system 102 generates a clutter-free composition, where one or more clutter objects are absent in the action composition.

Figure 10:
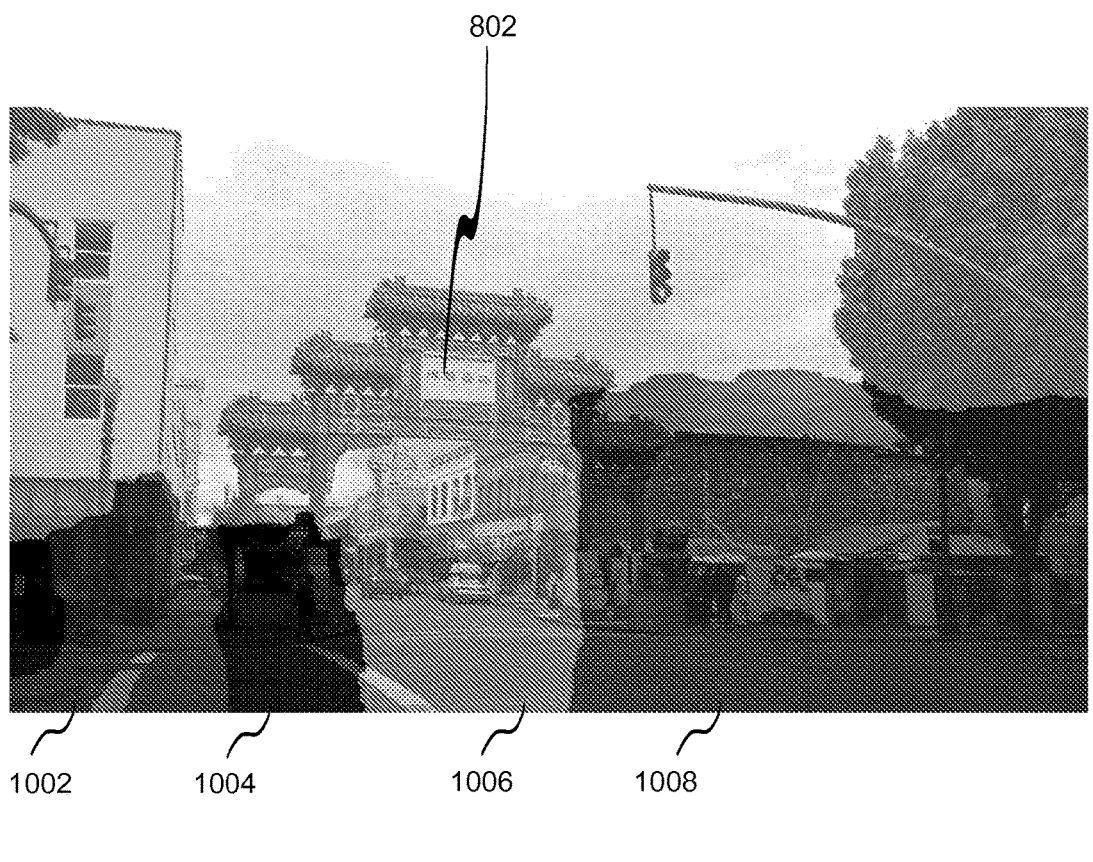
FIG. 10 illustrates an example preliminary action composition, according to some implementations.

FIG. 10 illustrates an example preliminary action composition 1000, according to some implementations. In various implementations, action composition 1000 includes portions of photos, where objects (e.g., person 804, car 806, and person 908, and of respective photos 800 and 900 of FIGS. 8 and 9) are removed or "erased." System 102 achieves this by substituting patches with "clutter" in particular portions of the scene with patches without clutter in those same portions, where the patches without clutter are taken from other photos in the sequence of photos.

In this example implementations, the base photo is photo 800 of FIG. 8 showing monument 802. Patches 1002, 1004, 1006, and 1008 other photos show portions where person 804, car 806, person 908, and other objects are absent from the scene. In various implementations, system 102 identifies corresponding patches in the sequence of photos where the objects are absent and uses those patches to provide the clutter-free composition.

In various implementations, system 102 removes as many cluttering objects as possible in order to create a clutter-free composition. As indicated above, in various implementations, system 102 applies the algorithms for aligning, normalizing, smoothing, and blending photos generating clutter-free compositions.

Figure 11:
FIG. 11 illustrates an example clutter-free composition, according to some implementations.

FIG. 11 illustrates an example clutter-free composition 1100, according to some implementations. FIG. 11 shows monument 802 without particular object (e.g., people, cars, etc.) blocking the view of monument 802. As shown, with zero user-action or user-intent, system 102 generates a single composition or photo that eliminates unwanted foreground by blending clutter-free backgrounds from multiple photos.

While some example implementations are described in the context of a monument, such implementations and others may apply to other objects (e.g., buildings, landscapes, etc.).

In various implementations, system 102 determines whether to erase or remove particular foreground objects. In some scenarios, the user might not want particular objects such as friends, family, etc. removed from a photo even if in front of a monument. In such situations, the person whom the person taking the picture (e.g., owner of the photo) intends to remain in the photo would probably be centered and not moving much. In some implementations, system 102 may recognize a person in a photo as a social connection to the person taking the picture. As such, system 102 would leave in the person, while removing other people walking by.

In some implementations, multiple types of compositions described herein may be applied to a photo or group of photos. In various implementations, system 102 may generate compositions that include different combinations of action compositions, clutter-free compositions, etc. For example, in some implementations, system 102 may generate an action composition within a clutter-free composition. Actual combinations will depend on the specific implementations.

Although the steps, operations, or computations in the method implementations described herein may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in photos. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their photos for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the photo. In some implementations, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the photo to one or more reference images with matching or similar features. In some implementations, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the photo matches a given reference image. In some implementations, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Implementations described herein provide various benefits. For example, implementations automatically generate action compositions and clutter-free compositions that users can share with their friends. Such implementations require no manual effort from users, and, in particular, implementations require no user knowledge of how to create compositions. Implementations described herein also increase overall engagement among users in a social networking environment.

Figure 12:
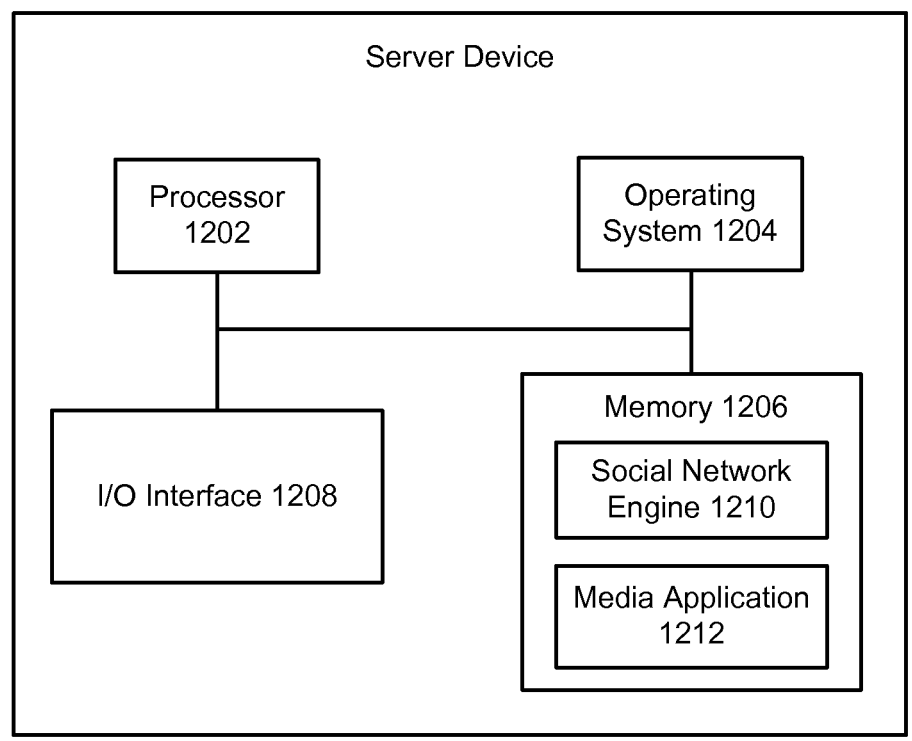
FIG. 12 illustrates a block diagram of an example server device, which may be used to implement the implementations described herein.

FIG. 12 illustrates a block diagram of an example server device 1200, which may be used to implement the implementations described herein. For example, server device 1200 may be used to implement server device 104 of FIG. 1, as well as to perform the method implementations described herein. In some implementations, server device 1200 includes a processor 1202, an operating system 1204, a memory 1206, and an input/output (I/O) interface 1208. Server device 1200 also includes a social network engine 1210 and a media application 1212, which may be stored in memory 1206 or on any other suitable storage location or computer-readable medium. Media application 1212 provides instructions that enable processor 1202 to perform the functions described herein and other functions.

For ease of illustration, FIG. 12 shows one block for each of processor 1202, operating system 1204, memory 1206, I/O interface 1208, social network engine 1210, and media application 1212. These blocks 1202, 1204, 1206, 1208, 1210, and 1212 may represent multiple processors, operating systems, memories, I/O interfaces, social network engines, and media applications. In other implementations, server device 1200 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method comprising:
   receiving a plurality of photos;
   determining a composition type from the plurality of photos, wherein the composition type is one of a plurality of different composition types, and wherein determining the composition type includes:
      determining that the plurality of photos meet one or more particular criteria for the composition type, wherein the one or more particular criteria relate to one or more comparisons between the plurality of photos;
      determining image content in the plurality of photos, the image content including foreground content and background content; and
      determining that at least a portion of the image content corresponds among the plurality of photos in a scene present in the plurality of the photos;
   generating a composition from the plurality of photos based on the composition type, wherein the generating includes modifying pixels of a base photo of the plurality of photos by adding respective portions of foreground content from different photos of the plurality of photos; and
   causing output of the composition by a display device.

2. The computer-implemented method of claim 1, wherein determining that at least the portion of the image content corresponds among the plurality of photos includes comparing metadata of the plurality of photos.

3. The computer-implemented method of claim 2, wherein comparing metadata includes comparing one or more of tags, timestamps, and geo-locations of the plurality of photos.

4. The computer-implemented method of claim 1, wherein determining that the plurality of photos meet the one or more particular criteria includes at least one of:
   determining that the plurality of photos were captured in sequence; and
   determining that a position of corresponding foreground content in the different photos changes relative to corresponding background content.

5. The computer-implemented method of claim 4, wherein the position of the corresponding foreground content is in a centrally-located portion of each of the plurality of photos.

6. The computer-implemented method of claim 1, wherein the composition is of an action composition type, and wherein an active object is in at least two different positions in the composition.

7. A system comprising:
   one or more hardware processors; and
   logic encoded in one or more tangible media, that when executed by the one or more hardware processors causes the one or more hardware processors to perform operations comprising:
      receiving a plurality of photos;
      determining that the plurality of photos meet criteria for at least one composition type, wherein the criteria relate to one or more comparisons between the plurality of photos;
      determining image content in the plurality of photos, the image content including foreground content and background content;
      determining that at least a portion of the image content corresponds among the plurality of photos in a scene present in the plurality of the photos;
      generating a composition of the at least one composition type from the plurality of photos, wherein the generating includes modifying pixels of a base photo of the plurality of photos by adding respective portions of foreground content from different photos of the plurality of photos; and
      providing the composition to a user.

8. The system of claim 7, wherein determining that at least the portion of the image content corresponds among the plurality of photos includes comparing metadata of the plurality of photos.

9. The system of claim 8, wherein comparing metadata includes comparing one or more of tags, timestamps, and geo-locations of the plurality of photos.

10. The system of claim 7, wherein determining that the plurality of photos meet the criteria includes at least one of:
    determining that the plurality of photos were captured in sequence; and
    determining that a position of corresponding foreground content in the different photos changes relative to corresponding background content.

11. The system of claim 10, wherein the position of the corresponding foreground content is in a centrally-located portion of each of the plurality of photos.

12. The system of claim 7, wherein the composition is of an action composition type, and wherein an active object is in at least two different positions in the composition.

13. The system of claim 7, wherein the composition is of a clutter-removed composition type, and wherein the plurality of photos each include a foreground object that is in a different position in each of the plurality of photos, and wherein the composition excludes the foreground object.

14. A computer-implemented method comprising:
    determining a composition type from a plurality of photos, wherein determining the composition type includes:
       determining, based on comparison of the plurality of photos, that the plurality of photos meet one or more particular criteria for the composition type;
       determining image content in the plurality of photos, the image content including foreground content and background content; and
       determining that the image content in the plurality of the photos is similar;
    generating a composition from the plurality of photos based on the composition type, wherein the generating comprises modifying pixels of a base photo of the plurality of photos by adding a respective portion of image content from one or more other photos of the plurality of photos; and
    providing the composition to a user.

15. The computer-implemented method of claim 14, wherein generating the composition further comprises:
    segmenting each of the plurality of photos; and
    based on the segmenting, determining the respective portion of the image content in the one or more other photos.

16. The computer-implemented method of claim 14, wherein the adding comprises applying a blending algorithm to the respective portion of the image content of the one or more other photos.

17. The computer-implemented method of claim 14, wherein determining that the image content in the plurality of the photos is similar comprises recognizing a same object in a center region of each of the plurality of photos.

18. The computer-implemented method of claim 17, wherein the respective portion of the image content is associated with the same object, and wherein adding the respective portion of the image content comprises replacing a particular foreground object in the base photo with the respective portion.

19. The computer-implemented method of claim 14, wherein determining that the image content in the plurality of the photos is similar comprises:
   recognizing a foreground object in each of the plurality of photos, wherein the foreground object is in a different position in each of the plurality of photos; and
   recognizing a static background in each of the plurality of photos.

20. The computer-implemented method of claim 19, wherein the respective portion of the one or more other photos includes the foreground object.

\* \* \* \* \*